Sept. 12, 1967          C. R. FEGLEY          3,341,682
AUTOMATIC ASSEMBLING AND WELDING MACHINE
Filed Dec. 4, 1963          7 Sheets-Sheet 1
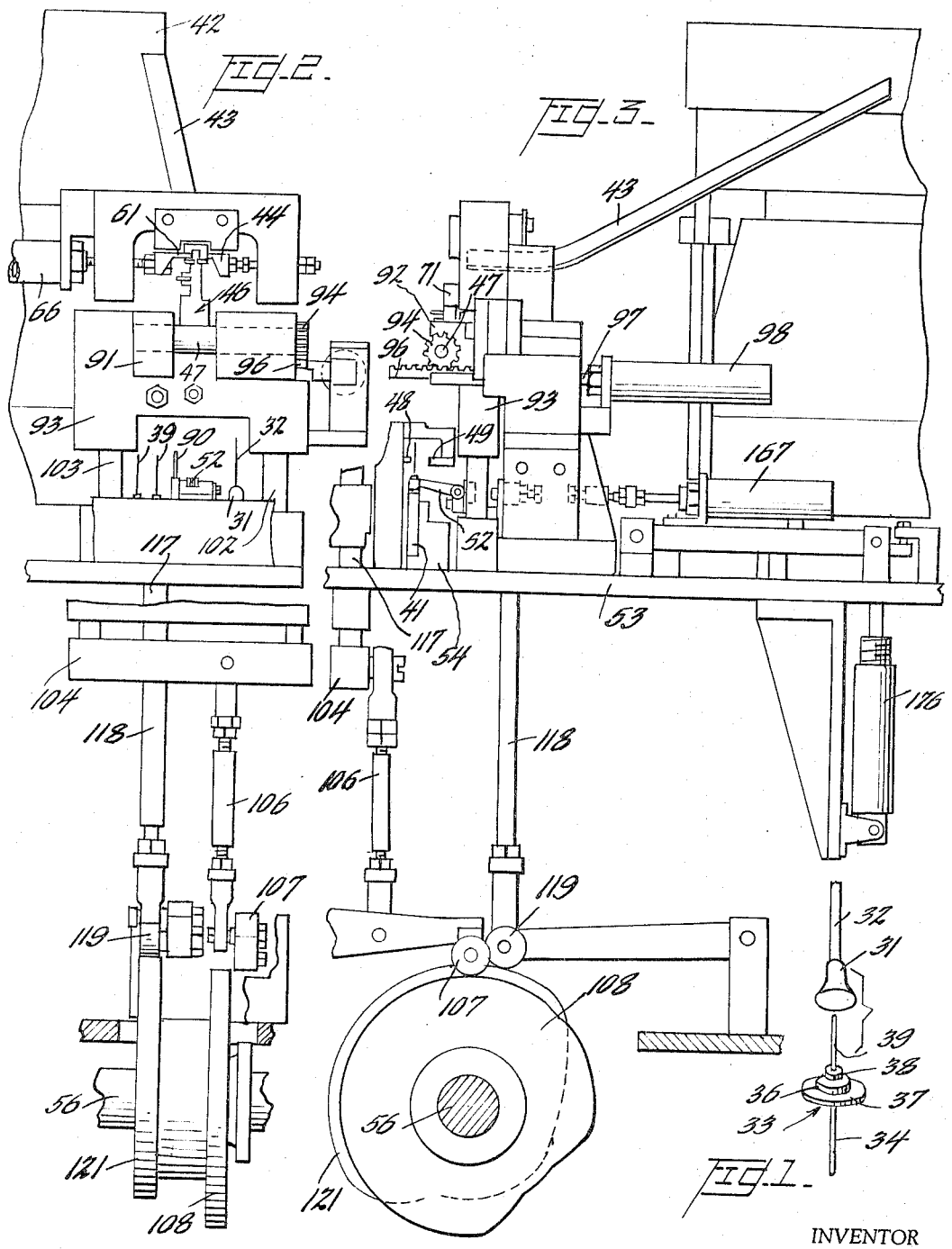
INVENTOR
C. R. Fegley,
BY R. P. Miller
ATTORNEY

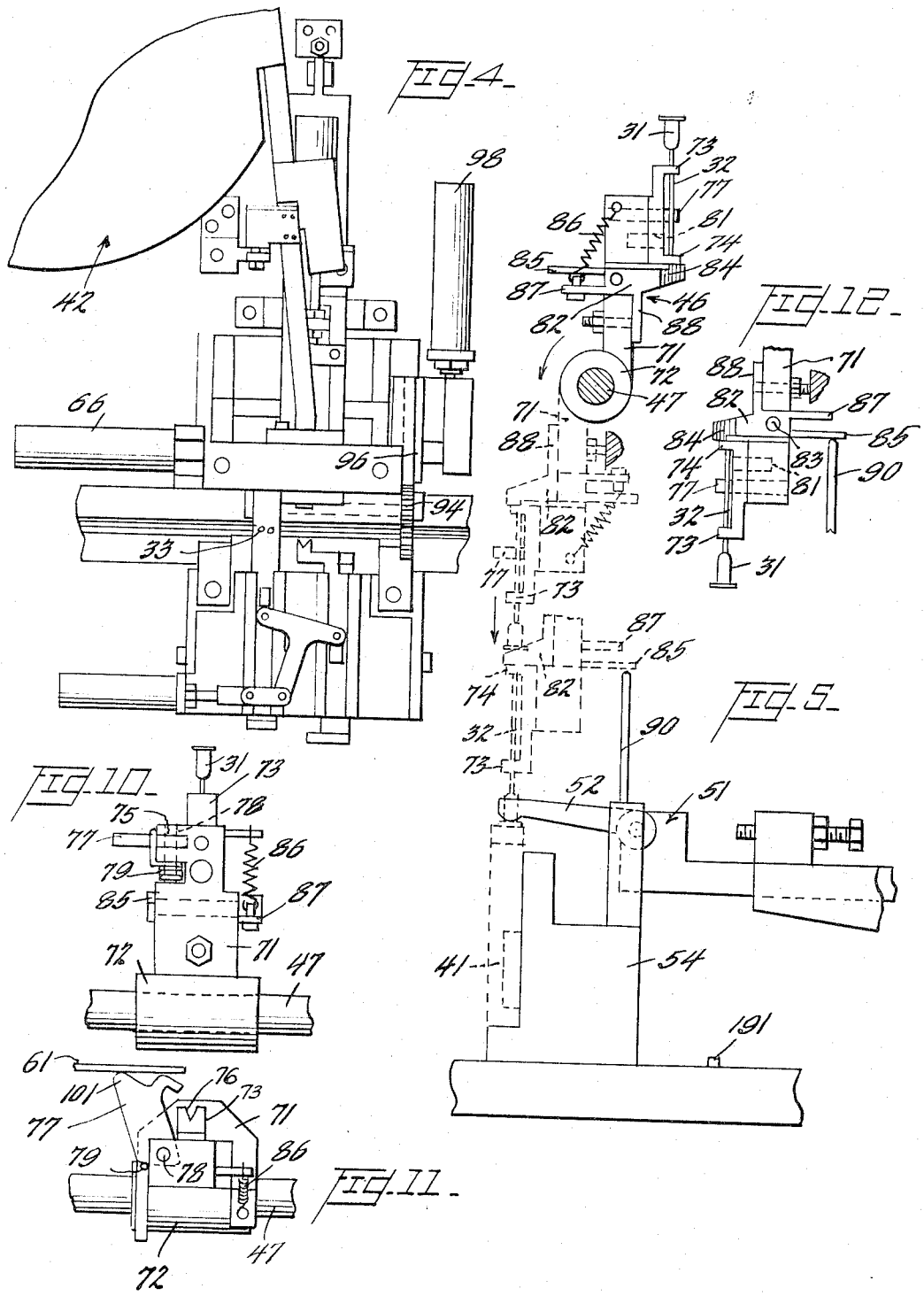

Sept. 12, 1967  C. R. FEGLEY  3,341,682
AUTOMATIC ASSEMBLING AND WELDING MACHINE
Filed Dec. 4, 1963  7 Sheets-Sheet 3
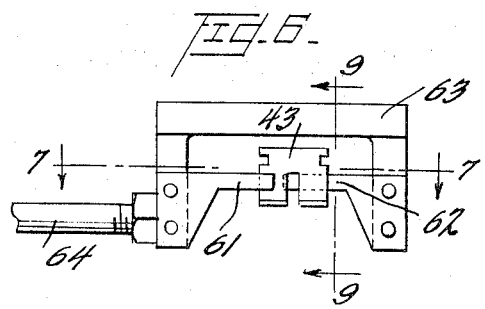
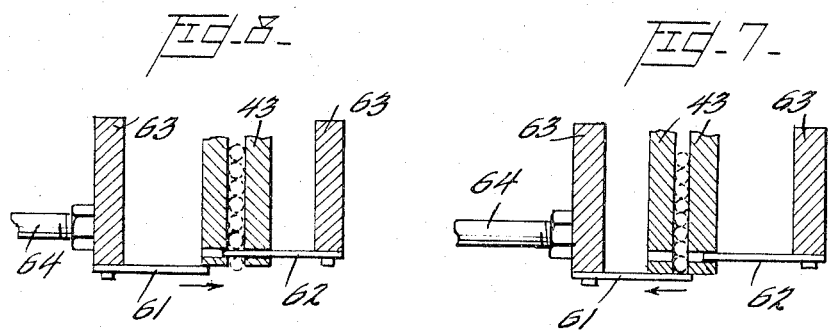
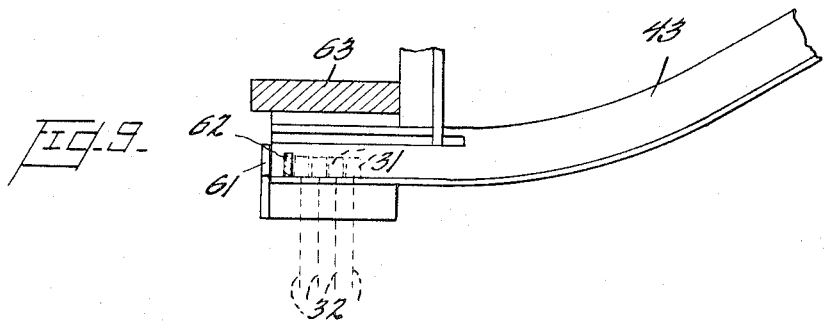

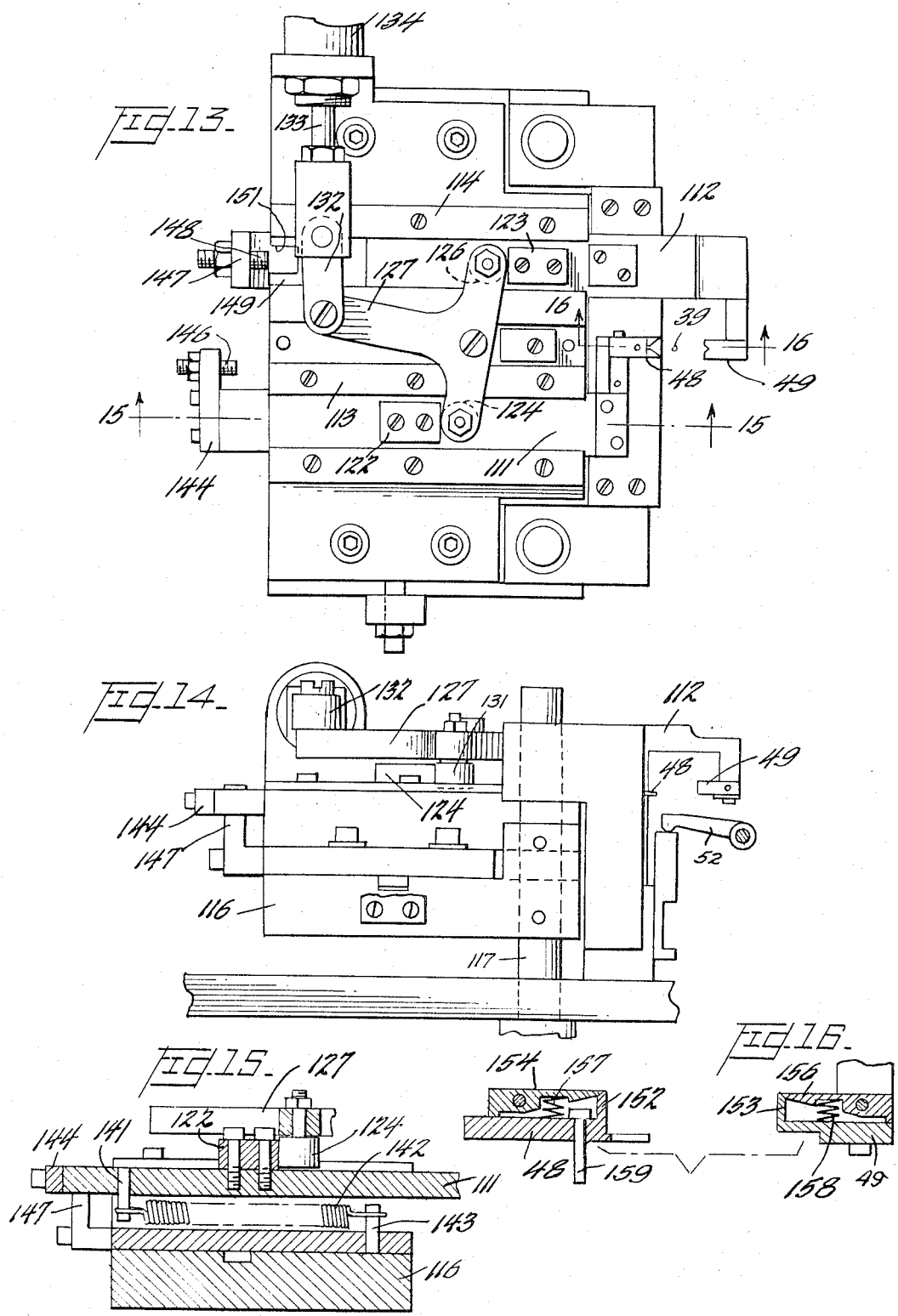

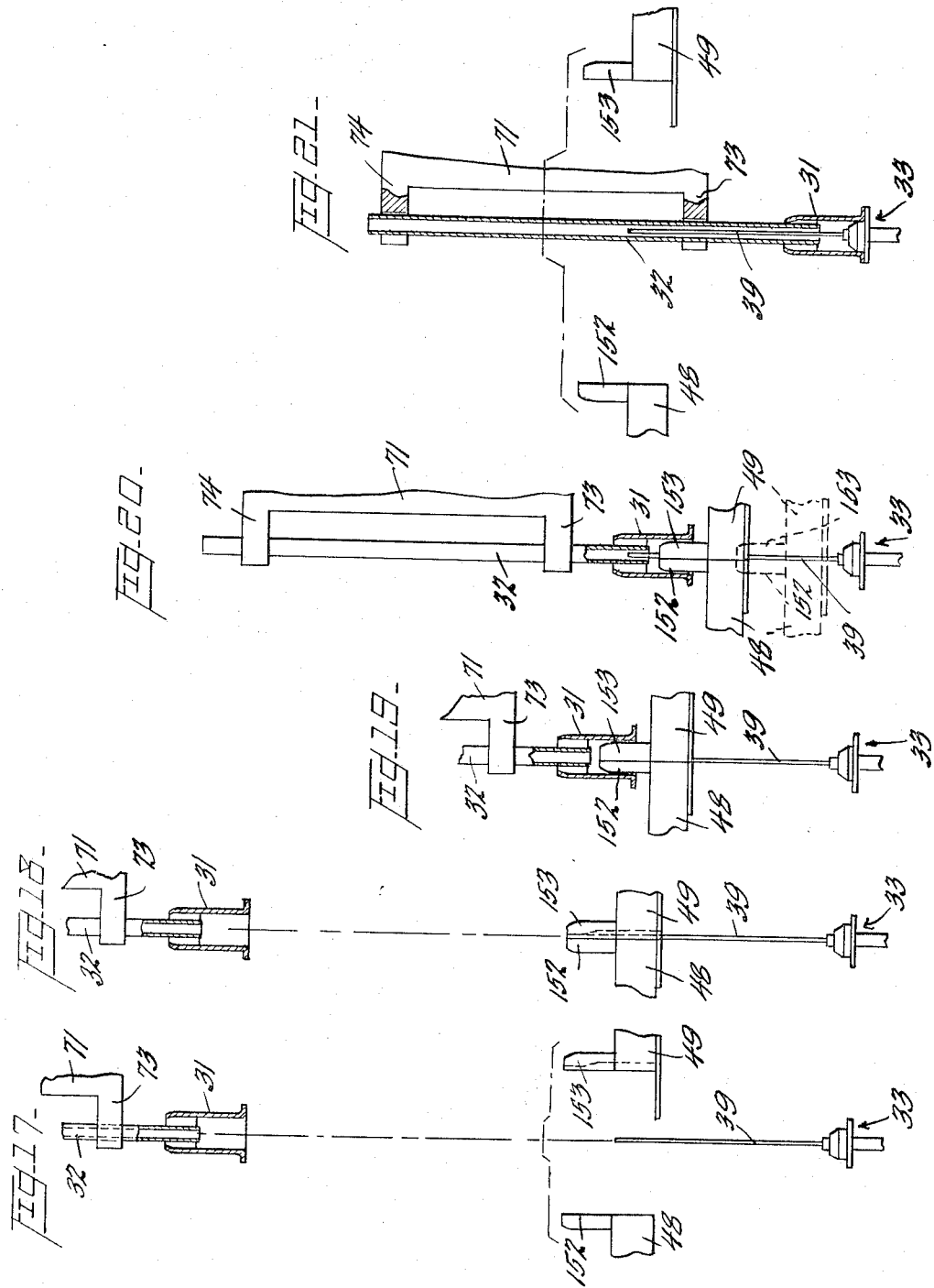

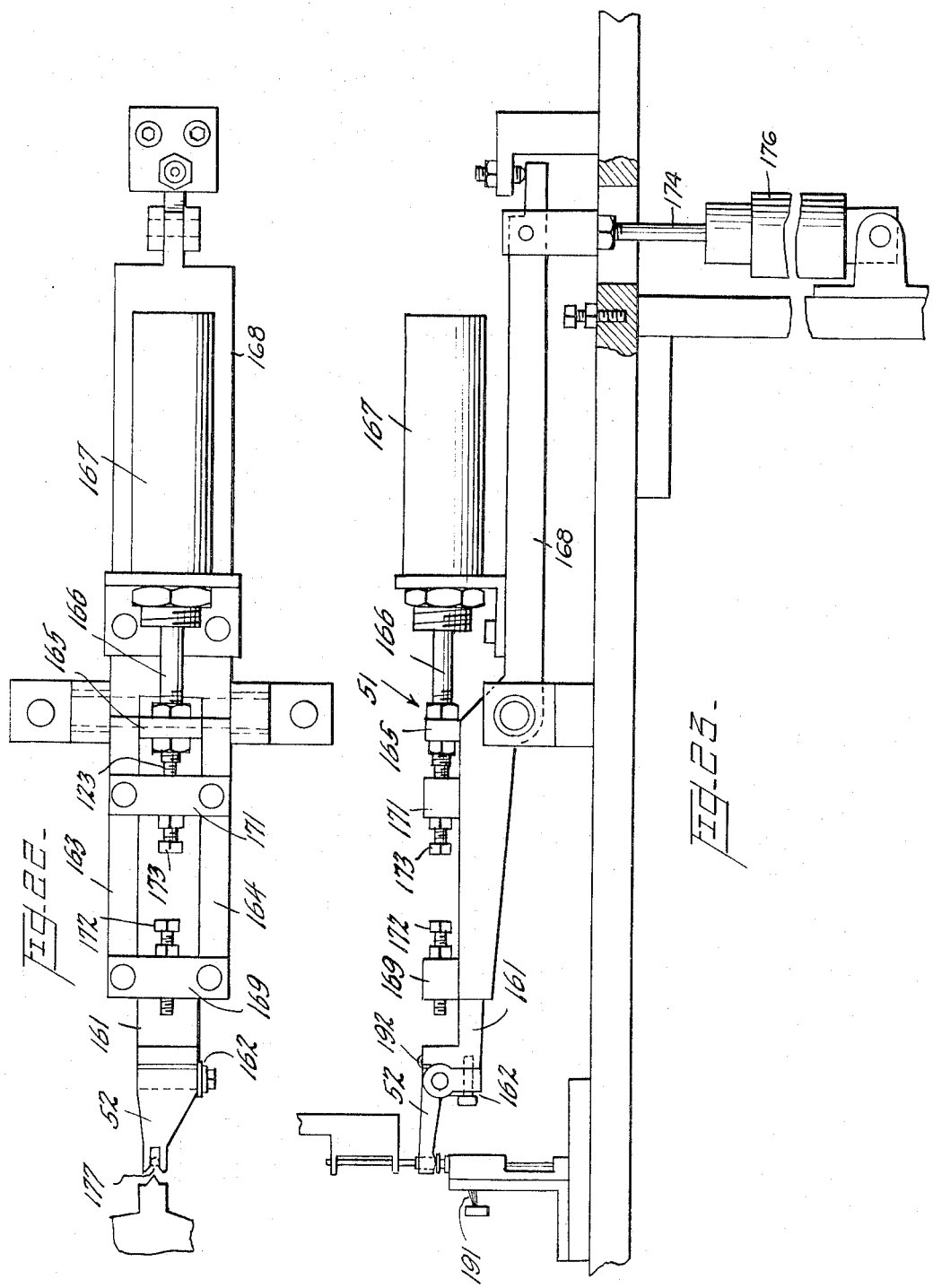

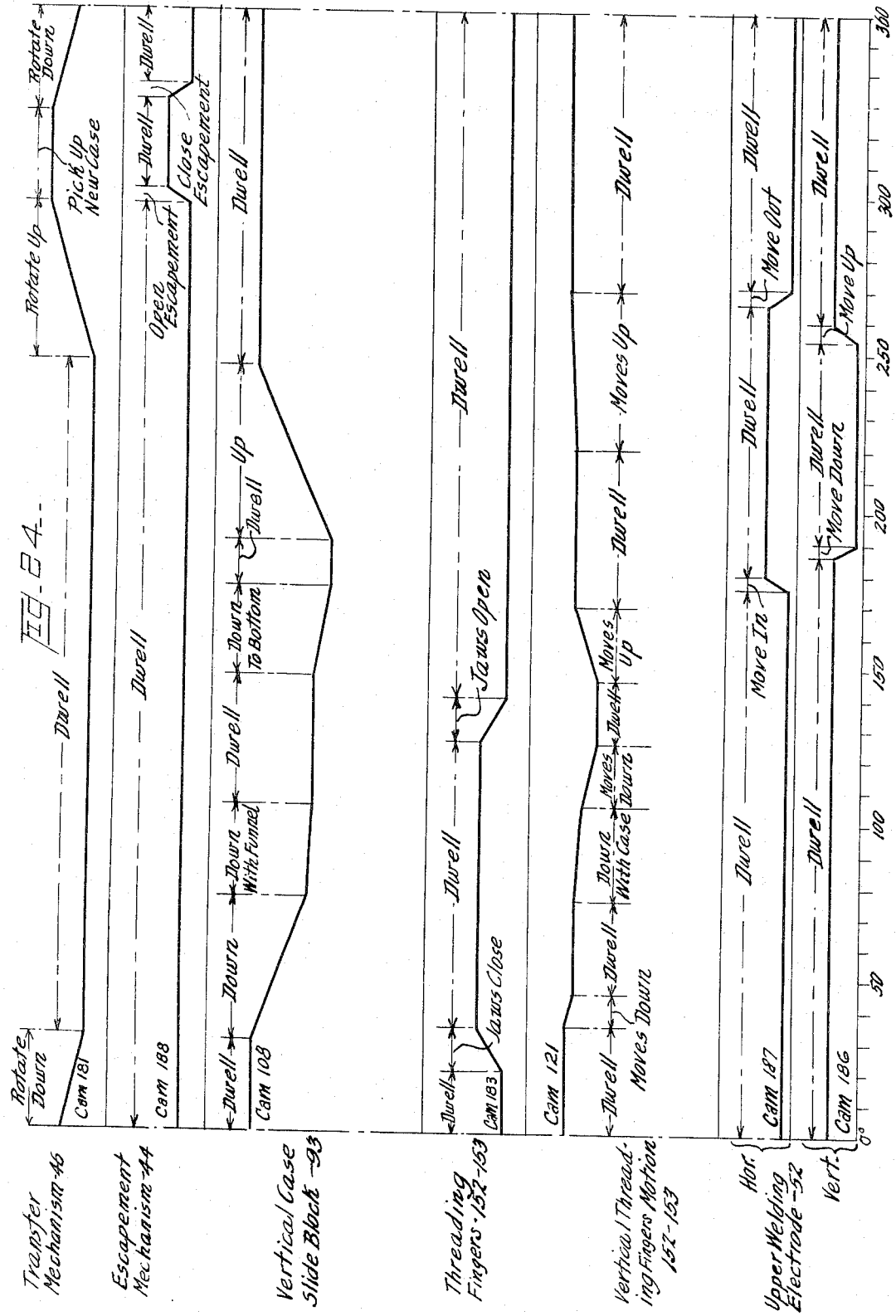

United States Patent Office 3,341,682
Patented Sept. 12, 1967

3,341,682
AUTOMATIC ASSEMBLING AND WELDING
MACHINE
Charles R. Fegley, Laureldale, Pa., assignor to Western
Electric Company, Incorporated, New York, N.Y., a
corporation of New York
Filed Dec. 4, 1963, Ser. No. 327,971
7 Claims. (Cl. 219—78)

ABSTRACT OF THE DISCLOSURE

An automatic machine assembles a tubulated, paramagnetic can over a diode wafer which has a stud lead extending therefrom. The can is advanced over a pair of fingers which slidably grip the stud wire whereafter the fingers are further moved axially of the stud wire and then transversely out of engagement therewith. The can is then moved into engagement with the wafer assembly and is welded thereto.

This invention relates to an automatic assembling and welding machine and, more particularly to a machine for automatically advancing a tubulated can onto a thin gold wire projecting from a semiconductor wafer assembly and then welding the can onto the assembly.

In the manufacture of semiconductor devices, such as diodes or transistors, a tubulated can or case is assembled over a thin gold termination wire that projects from a semiconductor body or wafer. This wire is of such a small diameter and is of such delicate strength that it is necessary to encase the wire within the metallic tube that emanates from the can which encases and protects the semiconductor wafer. Previously, due to the difficulty in handling the thin wire, it was necessary to insert the wire into the tubulated can by careful, tedious, manual operations and manipulations.

It is an object of this invention to provide a new and improved automatic assembling and welding machine.

Another object of the invention resides in a machine for automatically assembling tubulated cans over thin wires emanating from semiconductor components.

A further object of the invention is the provision of an assembly device that may be rotated to pick an article from a storage device and subsequently be translated to assemble the article onto a second article.

An additional object of the invention resides in a carrier that advances a tubulated can from a first orientation into a second orientation, whereupon guide facilities are actuated to enter the can and guide a wire into the tubulation.

A still further object of the invention is the provision of a carrier having a combination of mechanical and magnetic holding facilities for a tubulated can, which is moved to orient and assemble the tubulated portion of the can over a thin wire emanating from a semiconductor wafer; whereafter, a welding device may be operated to secure the can in position.

With these and other objects in view, the present invention contemplates an automatic assembly station for assembling tubulated cans into rack-carried semiconductor assemblies having upwardly projecting thin wire leads. More particularly, a carrier having holding facilities is rotated to pick up a can from a track, whereafter the carrier is rotated and translated to assemble the tubulated portion of the can over the thin wire. During this assembly operation, a pair of guide fingers are positioned within the can to guide the wire into the tubulation. As the can approaches the wafer assembly, the guide fingers are moved from within the can and from the path of the moving can to permit the seating of the can onto the wafer assembly. A welding device is now actuated to advance a welding electrode into position to weld a flange of a can onto the wafer assembly.

Other objects and advantages of the present invention will be apparent from the following detailed description when considered in conjunction with the accompanying drawings wherein:

FIG. 1 is an exploded view of a tubulated can that is to be assembled on a semiconductor wafer assembly by the machine shown in the other figures;

FIG. 2 is a front elevational view of an automatic assembly machine embodying the principles of the invention, and particularly illustrating a carrier for advancing a tubulated can from an escapement to an assembly position;

FIG. 3 is a side elevational view of the machine shown in FIG. 2, particularly depicting the facilities for advancing the carrier, together with facilities for welding the can onto the wafer assembly;

FIG. 4 is a top plane view of the automatic assembly machine shown in FIGS. 2 and 3;

FIG. 5 is also a side elevational view of the machine partially cut away to show in phantom outline the movement of the carrier;

FIG. 6 is a front view of an escapement mechanism;

FIG. 7 is a sectional view taken along line 7—7, illustrating the escapement in a closed position;

FIG. 8 is a sectional view again taken along line 7—7 of FIG. 6, illustrating the escapement in an open position;

FIG. 9 is a sectional view taken along line 9—9 of FIG. 6, illustrating the escapement in relation to a feed track for storing and advancing a supply of tubulated cans;

FIG. 10 is a front elevational view of the carrier and a latching device for holding a can on the carrier;

FIG. 11 is a top plane view of the carrier showing the latching device in an open position;

FIG. 12 is a side elevational view of the carrier in conjunction with a stop for actuating a lever on the carrier to tap the tubulated can into a final assembly position;

FIG. 13 is a top plane view of a mechanism for engaging and guiding the thin gold wire into the tubulation on the can;

FIG. 14 is a side view of a guide mechanism shown in FIG. 13, together with an electrode for welding the can onto the wafer assembly;

FIG. 15 is a sectional view taken along line 15—15 of FIG. 13, illustrating a slide for moving a wire guide element;

FIG. 16 is an enlarged sectional view taken along line 16—16 of FIG. 13 showing the structure of the wire guide elements;

FIGS. 17, 18, 19, 20 and 21 are a series of side elevational views showing the carrier and the guide elements in various relative positions during the assembly of a tubulated can onto a wafer assembly;

FIG. 22 is a top plane view of a welding apparatus for securing the tubulated can to the wafer assembly;

FIG. 23 is a side elevational view of the welding apparatus shown in FIG. 22, particularly illustrating the actuating mechanism for moving the welding electrode; and FIG. 24 is a timing diagram showing the contours for a series of cams for operating the various component mechanisms.

Referring first to FIG. 1, there is shown a flanged can or case 31 having a tubulation 32 that is to be assembled and welded to a semiconductor wafer assembly generally designated by the reference numeral 33. This wafer assembly 33 comprises a gold-plated stud wire 34, a disclike stud 36, a wafer 37 of semiconductor material, a gold termination 38, and a thin fragile gold wire 39.

General description

Referring now to FIGS. 2, 3, 4 and 5 for a general description of the major components and the mode of operation of these components in assembling the can, or case 31, onto the wafer assembly 33, there is shown an electrical conductive rack 41 that is loaded with wafer assemblies 33. The rack has a number of holes formed therein to receive the stud wires 34 so that the disc studs 36 rest on the top of the rack. The rack is cyclically advanced by suitable means (not shown) during the dwell periods in the cycle of operation of the overall machine. Each time the rack is advanced, a wafer assembly 33 is positioned within the machine to receive a tubulated can 31. The tubulated cans are stored in a vibratory hopper 42 and sequentially advanced down a track 43 and retained therein by an escapement 44. A carrier, or transfer mechanism, generally designated by the reference numeral 46 (see particularly FIG. 5) is rotated about a shaft 47 to pick up a tubulated can 31 upon release of the escapement 44. The carrier 46 is rotated 180 degrees and then moved in translatory fashion toward the rack 41.

As the transfer mechanism advances, a pair of funnel shaped guides or guide elements 48 and 49 (see FIGS. 3, 4 and 13) are moved to engage the upper extremity of the thin gold wire 39 to guide this wire into the tubulation 32. Both the transfer mechanism 46 and the guides 48 and 49 move in unison to seat the wire in the tubulation 32; whereafter, the wire guides move from within the can 31 and separate to permit the transfer mechanism 46 to seat the can 31 onto the disc stud 36 of the wafer assembly 33. Now a welding device 51 (see FIG. 5) is operated to move a welding electrode 52 into position to tack weld a flange of the can 31 to the disc stud 36.

Rack feed and tubulated can feed

The overall machine is mounted in a housing generally designated by the reference numeral 53. The racks 41 are advanced along a conductive guide block 54 to position each succeeding wafer assembly 33 in position to receive a tubulated can 31. The advance of the tracks 41 may be under the control of a cam (not shown) mounted on a constantly rotating cam shaft 56, which may drive any suitable well known drive mechanism such as a pawl and rack mechanism. The advance of the rack is, as previously mentioned, accomplished during dwell periods in the operation of the other component mechanisms.

The tubulated cans 31 are loaded in a vibratory hopper 42 and are oriented so that the cans emanating from the hopper have the tabulations 32 extending at a downward position. These tubulated cans 31 are advanced along a slotted vibratory track 43 and are retained by the escapement 44. This escapement (see FIGS. 6, 7 and 9) includes a pair of bars 61 and 62 mounted on a U-shaped bracket 63 that is attached to a piston rod 64. When the piston rod 64 is moved by an air cylinder 66, the bars 61 and 62 move from the position shown in FIG. 7 to the position shown in FIG. 8 to release the leading tubulated can 31. The operation of the air cylinder 66 is also under the control of a cam (not shown) mounted on the shaft 56. This cam actuates a switch to energize a solenoid which in turn controls a simple reversing valve in the air line supply for the cylinder 66.

Transfer mechanism

Referring first to FIGS. 5, 10, 11 and 12 wherein the details of the transfer mechanism 46 are shown, the transfer mechanism includes a carrier 71 connected to a hub 72 securely mounted to the shaft 47. Attached to the carrier 71 is a pair of spaced holding elements 73 and 74 having V-shaped notches 76 to receive the tubulation 32.

The carrier 71 is provided with a transverse slot 75 to receive a latch 77 pivotally mounted about a stud shaft 78. A coil spring 79 is seated within another slot formed in the carrier 71 and is adapted to engage and urge the latch 77 into position to hold the tubulation 32 against the holding elements 73 and 74. Mounted within the carrier 71 is a permanent magnet 81, which is effective to act upon the paramagnetic tubulation and thus hold the tubulation and can 31 within the V-shaped notches 76.

In order to further position the tubulation 32 within the V-shaped notches, a multi-arm lever 82 is provided. This is pivotally mounted on a shaft 83 and has a forward extending arm 84 overlying the upper V-shaped notch 76 formed in the holding element 74. A spring 86 interconnects the carrier 71 and another arm 87 of the lever 82 to urge the arm 84 away from the end of the tubulation 32. However, the lever 82 is provided with another arm 88 which overlies the front face carrier 71 to limit movement of the lever 82 and the arm 84 away from the end of the tubulation 32.

The multi-arm lever 82 is also provided with an arm 85 which is adapted to engage a stop rod 90 when the transfer mechanism 46 is moved to the down or assembly position.

Considering now the mechanism for rotating and translating the transfer mechanism 46, it will be noted from FIGS. 2, 3 and 4 that the shaft 47 is rotatably mounted in a pair of spaced blocks 91 and 92 attached to a slide block 93. Attached to the end of the shaft 47 is a pinion 94 meshing with a rack 96 attached to a piston rod 97 seated within an air cylinder 98. Operation of this air cylinder is under the control of a cam (not shown) mounted on the shaft 56 through suitable circuitry and valving of a well known commercial type (not shown), similar to that described with respect to air cylinder 66. When the rack 96 is moved towards the left, as viewed in FIG. 3, the shaft 47 is rotated in a cdockwise direction to move the transfer mechanism 46 from a downwardly extending position to an upwardly extending position to receive a tubulated can 31. When the air applied to the cylinder 98 is reversed, the rack is moved toward the right, as viewed in FIG. 3, and the shaft 47 is rotated in a counterclockwise direction to move the transfer mechanism 46 from the up position to a down position.

When the transfer mechanism 46 is moved to the up position, a lobe portion 101 of the latch 77 engages the escapement 61 (see FIGS. 2 and 11), and opens the latch to the position shown in FIG. 11. In the up position of the transfer mechanism 46 with the latch 77 open, the air cylinder 66 is operated to release the escapement whereupon a tubulated can 31 advances from the track 43 into the V-shaped notches 76 of the holding elements 73 and 74. The can 31 and tubulation 32 are maintained in position by the permanent magnet 81. The air cylinder 98 is reversed and the shaft 47 and transfer mechanism 46 are rotated in a counterclockwise direction whereupon the latch 77 under the urging of the spring 79 moves to engage the tubulation 32.

Considering now the translatory movement imparted to the transfer mechanism 46, it will be noted that the slide block 93 is connected through rods 102 and 103 to a yoke 104 supported by a rod 106 having a cam follower 107. Cam follower 107 rides on a cam 108, whereupon the rotation of cam 108 imparts a translatory movement to the rod 106, the slide block 93 and, hence, the transfer mechanism 46. The transfer mechanism 46 is advanced downwardly to move the flanged open end of the can 31 toward a wire 39 projecting from the wafer assembly 33 loaded in the rack 41.

Funnel-shaped clamp mechanism

Considering now the mechanism for actuating the funnel-shaped guides 48 and 49 and referring to FIGS. 13, 14, 15 and 16, there is disclosed a pair of slides 111 and 112 for supporting the guide members 48 and 49. Slides 111 and 112 are mounted in suitable pairs of ways 113 and 114 formed on a slide block 116 that is attached to a rod 117. Rod 117 is attached to a connecting rod 118 that is in turn connected to a follower 119 riding on a cam 121 (see FIG. 3). As the cam 121 rotates, the rod 118, the slide block 116 and the guide elements 48 and 49 will be moved upwardly or downwardly as the contour of the cam 121 dictates.

Projecting from the tops of the pair of slides 111 and 112 are follower blocks 122 and 123 that are engaged by actuator rollers 124 and 126 mounted respectively on the ends of opposed arms of a double bell crank 127. Bell crank 127 is pivotally mounted about a stud shaft 131 and is connected to a link 132 that in turn is connected to a piston rod 133 extending into an air cylinder 134.

Referring to FIG. 15, the slide 111 is shown with a depending pin 141 that is attached to a spring 142 anchored to a second pin 143 mounted within the slide block 116. Spring 142 urges the slide 111 toward the right, as viewed in FIG. 15, to urge the follower block 122 into engagement with the actuator roller 124. Attached to the rear portion of the slide 111 is a cross bracket 144 provided with a stop pin 146 which is adapted to engage the slide block 116 to limit the extent of movement of the slide 111.

The slide 112 is also provided with a spring similar to spring 142 for urging the follower block 123 into engagement with the actuator roller 126. Mounted on the rear portion of the slide 112 is an upright bar 147 provided with a stop pin 148 that is adapted to engage a portion 149 of the slide block 116 within a notch 151 to limit the extent of movement of the slide 112.

Referring now to FIG. 16, the guide elements 48 and 49 are shown with upwardly projecting funnel sections or fingers 152 and 153. These funnel sections are formed in a configuration to correspond, when brought together, with the inside configuration of the can 31. Pivotally mounted on the guide elements 48 and 49 is a pair of stripper levers 154 and 156 urged in an upward direction by springs 157 and 158. A headed stripper pin 159 is slideably mounted in the guide element 48 and is adapted to engage the wafer assembly holding rack 41, when the guide element 48 moves downwardly, so that the stripper pin acts against the stripper lever 154 to positively move the can 31 from the funnel shaped sections 152 and 153 of the guide elements 48 and 49.

*Welder*

Attention is directed to FIGS. 22 and 23 for the details of the welding apparatus 51. This welding apparatus includes the electrode 52 which is pivotally mounted on a slide bar 161 and spring urged by coil spring 162 in a counterclockwise direction. The slide bar 161 is mounted within guide ways 163 and 164 and is attached through a block 165 to a piston rod 166 extending into an air cylinder 167. The guide ways 163 and 164 are formed in a lever 168 which suports a pair of brackets 169 and 171. Projecting through the brackets 169 and 171 are stop pins 172 and 173 adapted to respectively engage the rear of the electrode 52, and front end of the piston rod 166, to limit the extent of movement of the piston rod.

The lever 168 is provided to pivot the electrode 52 into engagement with the flange extending from the can 31. This lever is attached at its rear extremity to a piston rod 174 fitted within an air cylinder 176. Briefly, operation of the air cylinder 167 moves the electrode 52 toward the can 31 and the operation of the air cylinder 176 pivots the lever 168 and the electrode 52 into engagement with the flange of the can 31. The spring 162 controls the force applied by the electrode 52 against the flange of the can 31 during the welding operation. It will be noted that the forward extremity of the electrode 52 is provided with a notch 177 which conforms generally with the configuration of the body of the can 31 so that a sub-stantial portion of the flange of the can 31 is engaged by the electrode 52. Again the operations of the air cylinders 167 and 176 are under the control of cams mounted on the shaft 56 which actuate suitable switches, solenoids, and reversing valves to control the air flow to the cylinders.

*Overall operation*

A general understanding of the operation of the overall machine may be had by reference to FIGS. 17 through 21. In FIG. 17, the can 31 is shown held in the carrier 71 during a dwell period in the movement of the carrier toward the wafer assembly 33. The guide elements 48 and 49 are separated. In FIG. 18, guide elements 48 and 49 are shown in the closed position to slideably grip the upper extremity of the thin gold wire 39.

In FIG. 19, the carrier 71 has continued its downward movement and positioned the can 31 over the funnel sections 152 and 153 of the guide elements 48 and 49. The carrier 71 and the guide elements 48 and 49 now continue to move downwardly in unison as shown in FIG. 20. Another dwell occurs in the downward movement of the carrier 71 and the guide elements 48 and 49 are moved to the position shown in phantom outline in FIG. 20. It will be noted that the funnel sections 152 and 153 are now withdrawn from within the can 31. Next, the guide elements 48 and 49 separate, as illustrated in FIG. 21, and the carrier 71 continues the downward movement to position the can 31 over the wafer assembly 33.

The contours of the cams for operating the various mechanisms are shown in FIG. 24. Considering a cycle of operation of the machine and assuming that the transfer mechanism 46 is in the up position, and that the escapement 44 is operated to release a can 31 to advance into the transfer mechanism, then a cam 181 on shaft 56 operates a suitable circuit to control the admission of air to the cylinder 98, whereupon the rack 96 is moved toward the right, as viewed in FIG. 3, to rotate the transfer mechanism 46 in a counterclockwise direction. The cam 108 now presents a low portion to the follower 107, whereupon the transfer mechanism 46 is moved down toward the wafer assembly 33. As the transfer mechanism 46 moves down, a cam 183 is rendered effective to actuate suitable circuitry to control the admission of air to the cylinder 134. Piston rod 133 is advanced to pivot the double bell crank 127 and, as a result, the guide elements 48 and 49 move toward, and slideably engage, the thin gold wire 39. The cam 108 is effective to move the transfer mechanism 46 down to position the can 31 over the funnel sections 152 and 153 of the guide elements 48 and 49. Cams 108 and 121 now control the simultaneous downward movement of the transfer mechanism 46 and the guide elements 48 and 49. Cam 108 now presents a dwell section to its follower 107, thus permitting the cam 121 to move the guide elements 48 and 49 to withdraw the funnel sections 152 and 153 from within the can 31. Next, the cam 183 controls the separating of the guide elements 48 and 49.

The transfer mechanism 46 advances the can 31 onto the wafer assembly 33; whereafter, cams 186 and 187 are rendered effective to advance and pivot the welding electrode 52 into engagement with the flange of the can 31. As the transfer mechanism moves into the down position, the arm 85 strikes the stop pin 90 to pivot the multi-arm lever 82 to move the arm 84 into tapping engagement with the tubulation 32 to firmly seat the can 31 on the wafer assembly 33. The welding electrode is now energized under the control of a suitable cam, also mounted on the shaft 56, but not shown. The rack 41 is constructed of electrical conductive material and is selectively connected into the welding circuit by a brush 191 (see FIG. 23) when the rack 41 is positioned on the conductive block 54. A power lead not shown is connected to the welding electrode 52. The welding electrode 52 is maintained in position while the transfer mechanism is moved upwardly so that the latch 77 and guide elements 73 and 74 slide from engagement with the tubulation 32. Next, the transfer mechanism is returned to the initial position and the cam 188 is rendered effective to control the admission of air to the cylinder 66 to operate the escapement mechanism 44 to feed another can 31 into position for a subsequent cycle of operation of the machine.

It is to be understood that the above described arrangements of apparatus and construction of elemental parts are simply illustrative of an application of the principles of the invention and many other modifications may be made without departing from the invention.

What is claimed is:

1. In a machine for assembling a hollow article onto a second article supporting means for holding said second article,
    a carrier for supporting said hollow article with the open end in alignment with the second article,
    a pair of jaws mounted for movement toward and then along said second article, said jaws having upwardly projecting guide elements,
    means for moving said jaws into engagement with said second article and then moving said jaws along said article,
    means for advancing said carrier to move said hollow article over said upwardly projecting guide elements, and
    means for moving said jaws and guide elements relative to said advancing means to withdraw said guide elements from within said hollow article.

2. In an automatic assembling machine for advancing a tubulated can onto a thin wire projecting from a stud support,
    means having a pair of extending fingers for slidably gripping the wire near its free extremity and for positioning a tubulated can in alignment with said thin wire,
    first means for advancing a tubulated can over the fingers to position the tubulated can in alignment with the wire gripped by the fingers, and
    second means for advancing the fingers in unison with the advancing can and then moving the fingers from within the can and from gripping engagement with the wire whereupon the first advancing means advances the can into engagement with the stud support.

3. In a machine for advancing a can having a tube integral therewith onto a stud support having an upwardly projecting wire, said tube initially extending upwardly from said can,
    means for gripping said tube and rotating said can so that the tube extends downwardly from said can and is aligned with said wire,
    first means for advancing said gripping means toward said wire to move the can over said wire,
    means for slidably gripping said wire within said can to guide the wire into said tube,
    second means for advancing said wire gripping means to move with said advancing can and then relative to said can to slide over said wire, and
    means for opening said gripping means to release said wire whereupon said advancing can moves past the opened gripping means and into engagement with said stud support.

4. In an assembly machine for advancing a can having a downwardly projecting tube from a storage track onto a support having an upwardly projecting wire,
    means for feeding cans along said track with the tubes projecting in a downwardly direction,
    an escapement having a release slide means positioned to hold tubulated cans in said track,
    a carrier mounted for rotary and translatory movement,
    a first pair of spaced holding elements mounted on said carrier,
    a spring urged holding latch rotatably mounted on said carrier between said first pair of holding elements for engaging and holding a tube against the spaced holding elements,
    means for rotating said carrier to move said latch into engagement with said release slide means to rotate said latch from between said spaced holding elements,
    means for operating said escapement to move said release slide to allow a can to advance and move its tube into engagement with said first pair of holding elements,
    means for reversing the rotation of said carrier to move said spring urged latch from engagement with said release slide means whereupon said spring urged latch moves into engagement with the tube engaging said spaced holding elements,
    means for imparting a translatory movement to said carrier to advance the can and tube over said wire,
    means movable within the can for guiding said wire into said tube while said carrier is moving, and
    means for withdrawing said guiding means from within the can and from the path of movement of the can as the can approaches the support for said wire.

5. In an automatic assembly machine having a transfer-mechanism for advancing a tubulated can onto a wire extending from a semiconductor wafer assembly wherein said transfer mechanism comprises,
    a block mounted for sliding movement,
    a carrier pivotally mounted on said block,
    a pair of spaced holding members mounted on said carrier,
    a latch pivotally mounted on said carrier between said spaced holding members for engaging and holding a tubulated can against said spaced holding members,
    a rack and pinion for rotating said carrier from a downwardly extending position to an upwardly extending position,
    means positioned in the path of movement of said latch for engaging and opening said latch to receive a tubulated can,
    a tapper lever pivotally mounted on said carrier having the ends thereof projecting from the opposite side of the carrier,
    resilient means for urging said tapper lever to move one end thereof away from the tubulated can,
    means for again actuating said rack and pinion to rotate said carrier from the upwardly extending position to a downwardly extending position,
    means for sliding the block in a downward direction to advance the carrier and the tubulated can onto the wire, and
    a stop for engaging the advancing tapper lever to pivot said lever to tap and force the tubulated can into engagement with the semiconductor wafer assembly.

6. In an apparatus for assembling and welding a flanged can onto a base assembly,
    means for supporting said base assembly,
    means for advancing the can onto the base assemebly,
    a lever pivotally mounted on said advancing means and having one end spaced from said can,
    a stop engaging the other end of said lever as the advancing means advances the can onto the base assembly for pivoting said lever and move the one end of the lever against the can to force the can into engagement with said base assembly,
    a slide means having a welding electrode pivotally mounted thereon and spaced from said base assembly supporting means,
    said electrode having a cutout portion corresponding to the cross section of said can,
    means operated upon the advance of said advancing means for moving said slide toward said supporting means, and
    means operated upon completion of movement of said slide for pivoting said electrode over said can to engage the flange and force the can into engagement with said base assembly.

7. In a machine for transferring a paramagnetic article from a track having a releasable escapement onto a second article,
a frame for supporting the track and escapement,
a block slidably mounted on the frame,
a carrier pivotally mounted on the block having a spaced pair of holding elements,
a magnet mounted on the carrier and positioned between said spaced holding elements,
a spring urged latch pivotally mounted on said carrier for engaging a paramagnetic article positioned against said spaced holding elements,
means for pivoting the carrier in a first direction to position said spaced holding elements to receive a paramagnetic article and simultaneously engaging the latch with the escapement to open said latch,
means for releasing said escapement to allow a paramagnetic article to pass into said spaced holding elements whereupon said magnet holds said paramagnetic article against the spaced holding elements,
means for pivoting the carrier in a second direction away from said escapement whereupon said spring urged latch moves to engage and hold said paramagnetic article against said spaced holding elements,
means for sliding said block to advance said paramagnetic article onto said second article,
means rendered effective upon the advance of the paramagnetic article onto said second article for engaging and holding said paramagnetic article, and
means for reversing the direction of movement of said block whereupon said engaging and holding means retains said paramagnetic article while said spring urged latch slides along the paramagnetic article.

References Cited
UNITED STATES PATENTS

| | | | |
|---|---|---|---|
| 922,437 | 5/1909 | Marshall | 29—203 X |
| 1,999,617 | 4/1935 | Randall | 219—103 |
| 2,792,489 | 5/1957 | Wohlman | 219—85 |
| 2,798,935 | 7/1957 | Kipp | 219—79 |
| 3,069,531 | 12/1962 | Hill et al. | 219—78 |

RICHARD M. WOOD, *Primary Examiner.*

B. A. STEIN, *Assistant Examiner.*

UNITED STATES PATENT OFFICE
CERTIFICATE OF CORRECTION

Patent No. 3,341,682 September 12, 1967

Charles R. Fegley

It is hereby certified that error appears in the above numbered patent requiring correction and that the said Letters Patent should read as corrected below.

Column 3, line 44, for "tracks" read -- racks --; line 54, for "tabulations" read -- tubulations --; column 7, line 15, after "article" insert a comma; lines 15 and 16, "supporting means for holding said second article," should appear as a separate element; same column 7, line 72, for "rotary" read -- rotatory --.

Signed and sealed this 3rd day of December 1968.

(SEAL)
Attest:

Edward M. Fletcher, Jr.

Attesting Officer

EDWARD J. BRENNER

Commissioner of Patents